(12) United States Patent
Kawada et al.

(10) Patent No.: US 10,987,737 B2
(45) Date of Patent: Apr. 27, 2021

(54) LAMINATE MOLDING APPARATUS

(71) Applicant: Sodick Co., Ltd., Kanagawa (JP)

(72) Inventors: Shuichi Kawada, Kanagawa (JP); Katsuhiro Nakano, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 3 days.

(21) Appl. No.: 16/181,362

(22) Filed: Nov. 6, 2018

(65) Prior Publication Data
US 2019/0143410 A1    May 16, 2019

(30) Foreign Application Priority Data

Nov. 16, 2017 (JP) .............................. JP2017-220623

(51) Int. Cl.
| | |
|---|---|
| *B29C 67/00* | (2017.01) |
| *B22F 10/20* | (2021.01) |
| *B33Y 50/02* | (2015.01) |
| *B33Y 30/00* | (2015.01) |
| *B22F 10/30* | (2021.01) |

(52) U.S. Cl.
CPC .............. *B22F 10/20* (2021.01); *B33Y 30/00* (2014.12); *B33Y 50/02* (2014.12); *B22F 10/30* (2021.01); *B22F 2999/00* (2013.01)

(58) Field of Classification Search
CPC ..... B29C 64/364; B29C 64/20; B29C 64/357; B29C 64/25; B33Y 30/00; B33Y 40/00
USPC ........................................................ 425/375
See application file for complete search history.

(56) References Cited

U.S. PATENT DOCUMENTS

| | | | | |
|---|---|---|---|---|
| 2015/0108095 A1* | 4/2015 | Kruer | ................... | B23K 9/167 |
| | | | | 219/74 |
| 2016/0207147 A1* | 7/2016 | Van Hassel | ............ | B33Y 30/00 |
| 2017/0341018 A1* | 11/2017 | She | ....................... | B29C 64/357 |
| 2018/0065209 A1* | 3/2018 | Foret | ...................... | B33Y 40/00 |
| 2018/0243827 A1 | 8/2018 | Nakano et al. | | |

FOREIGN PATENT DOCUMENTS

| | | |
|---|---|---|
| JP | 2006124732 | 5/2006 |
| JP | 5982047 | 8/2016 |
| WO | 2017047139 | 3/2017 |

OTHER PUBLICATIONS

"Office Action of Japan Counterpart Application," with machine English translation thereof, dated Jul. 19, 2018, p. 1-p. 7.

* cited by examiner

*Primary Examiner* — Thu Khanh T Nguyen
(74) *Attorney, Agent, or Firm* — JCIPRNET (57) ABSTRACT

Provided is a laminate molding apparatus including a chamber, a laser irradiation device, an inert gas supply device, a fume collector, and an evacuate device. The evacuate device includes an intake port, an evacuate amount adjusting portion, a controller, and an evacuate port. The intake port is connected to any part of the laminate molding apparatus through which the inert gas flows, and takes in the inert gas. The evacuate amount adjusting portion adjusts an evacuate amount of the inert gas. The controller controls the evacuate amount adjusting portion to evacuate the inert gas such that an atmospheric pressure in the chamber and an external atmospheric pressure become uniform within a range in which leakage of the inert gas from the chamber is suppressed. The evacuate port evacuates the inert gas from which fumes have been removed to the outside of the laminate molding apparatus.

6 Claims, 6 Drawing Sheets

LAMINATE MOLDING APPARATUS

CROSS-REFERENCE TO RELATED APPLICATION

This application claims the priority benefit of Japanese Application Serial No. 2017-220623, filed on Nov. 16, 2017. The entirety of each of the above-mentioned patent applications is hereby incorporated by reference herein and made a part of this specification.

BACKGROUND

Technical Field

The disclosure relates to a laminate molding apparatus.

Description of Related Art

In a powder bed fusion method, a material powder is uniformly spread on a molding table to form a material powder layer, a sintered layer is formed by irradiating a predetermined portion of the material powder layer with a laser beam and sintering it, a metal material powder is evenly spread on the sintered layer to form a new material powder layer, a new sintered layer joined to the lower sintered layer is formed by irradiating the new material powder layer with the laser beam and sintering it, and a plurality of sintered layers are laminated to form a desired three-dimensional object integrally formed of a sintered body by repeating these processes.

When the metal material powder is sintered by the laser beam, the surroundings of a predetermined molding region need to be kept in a state in which there is as little oxygen as possible in order to protect the material powder from degeneration and to stably irradiate the laser beam of required energy. Therefore, a laminate molding apparatus for carrying out a powder bed fusion method is configured to supply an inert gas into a sealed chamber and to irradiate a predetermined irradiation region with a laser beam in an atmosphere having a sufficiently low oxygen concentration in the chamber.

Also, when the metal material powder is sintered by being irradiated with the laser beam, specific smoke called fumes is generated. When the inside of the chamber is filled with fumes, the laser beam is shielded, the laser beam of required energy does not reach a sintering part, and thus sintering failure may occur.

Therefore, the laminate molding apparatus for carrying out a powder bed fusion method is configured to maintain the inside of the chamber in a clean inert gas atmosphere by supplying a clean inert gas into the chamber and discharging the inert gas containing the fumes from the inside of the chamber. Here, as disclosed in Patent Document 1 (Japanese Patent Publication No. 5982047), a laminate molding apparatus in which a fume collector removes fumes from an inert gas including fumes discharged to the outside of a chamber and returns the inert gas into the chamber again to circulate the inert gas in the chamber is known. In this way, since the inert gas can be reused, an amount of inert gas used can be reduced. In such a laminate molding apparatus, there is a gap which cannot be avoided, and thus leakage of the inert gas or entry of external air may occur. Since a required amount of inert gas which exceeds a leakage amount is always supplied during at least molding to reliably and effectively remove the fumes from the molding region and to prevent degeneration of the material powder, an atmospheric pressure in the chamber tends to be pressurized.

When the atmospheric pressure in the chamber is higher than an external atmospheric pressure, the inert gas in the chamber leaks out of the laminate molding apparatus via the minute gap. Since the inert gas leaking from the chamber may contain the fumes, it is not favorable for occupational health.

SUMMARY

An embodiment of the disclosure provides a laminate molding apparatus including a chamber which covers a molding region, a laser irradiation device which irradiates a predetermined irradiation region of a material powder layer formed for each of a plurality of division layers obtained by dividing a desired three-dimensional object at a predetermined height with respect to the molding region with a laser beam and forms a sintered layer, an inert gas supply device which supplies an inert gas into the chamber, a fume collector which includes a dust collecting device for removing fumes from the inert gas discharged from the chamber and returns the inert gas from which the fumes have been removed to the chamber, and an evacuate device which evacuates the inert gas to an outside of the laminate molding apparatus, wherein the evacuate device includes an intake port which is connected to any part of the laminate molding apparatus through which the inert gas flows and takes in the inert gas, an evacuate amount adjusting portion which adjusts an evacuate amount of the inert gas to the outside of the laminate molding apparatus, a controller which controls the evacuate amount adjusting portion to perform evacuate of the inert gas to the outside of the laminate molding apparatus such that an atmospheric pressure in the chamber and an external atmospheric pressure become uniform within a range in which leakage of the inert gas from the chamber is suppressed, and an evacuate port which evacuates the inert gas from which the fumes have been removed to the outside of the laminate molding apparatus.

DESCRIPTION OF THE EMBODIMENTS

Hereinafter, embodiments of the disclosure will be described with reference to the drawings. Modified examples of a plurality of members described below can be freely combined and implemented. Unless otherwise specified, in the present specification, "evacuate" means sending of an inert gas to the outside of a laminate molding apparatus including a chamber and a fume collector. In other words, the "evacuate" means sending of the inert gas circulating between the chamber and the fume collector to the outside of the laminate molding apparatus. In addition, "leakage" means an unintended outflow of the inert gas from the laminate molding apparatus, in particular from the chamber, to the outside of the laminate molding apparatus.

The embodiments of the disclosure provide a laminate molding apparatus which prevents an inert gas containing fumes from leaking by evacuating the inert gas from which the fumes have been removed so that an atmospheric pressure in a chamber exceeds an external atmospheric pressure as little as possible.

In the laminate molding apparatus according to one or some embodiments of the disclosure, since the inert gas from which the fumes have been removed is evacuated so that the atmospheric pressure in the chamber exceeds the external atmospheric pressure as little as possible, leakage of the inert gas containing the fumes can be prevented.

Figure 1:
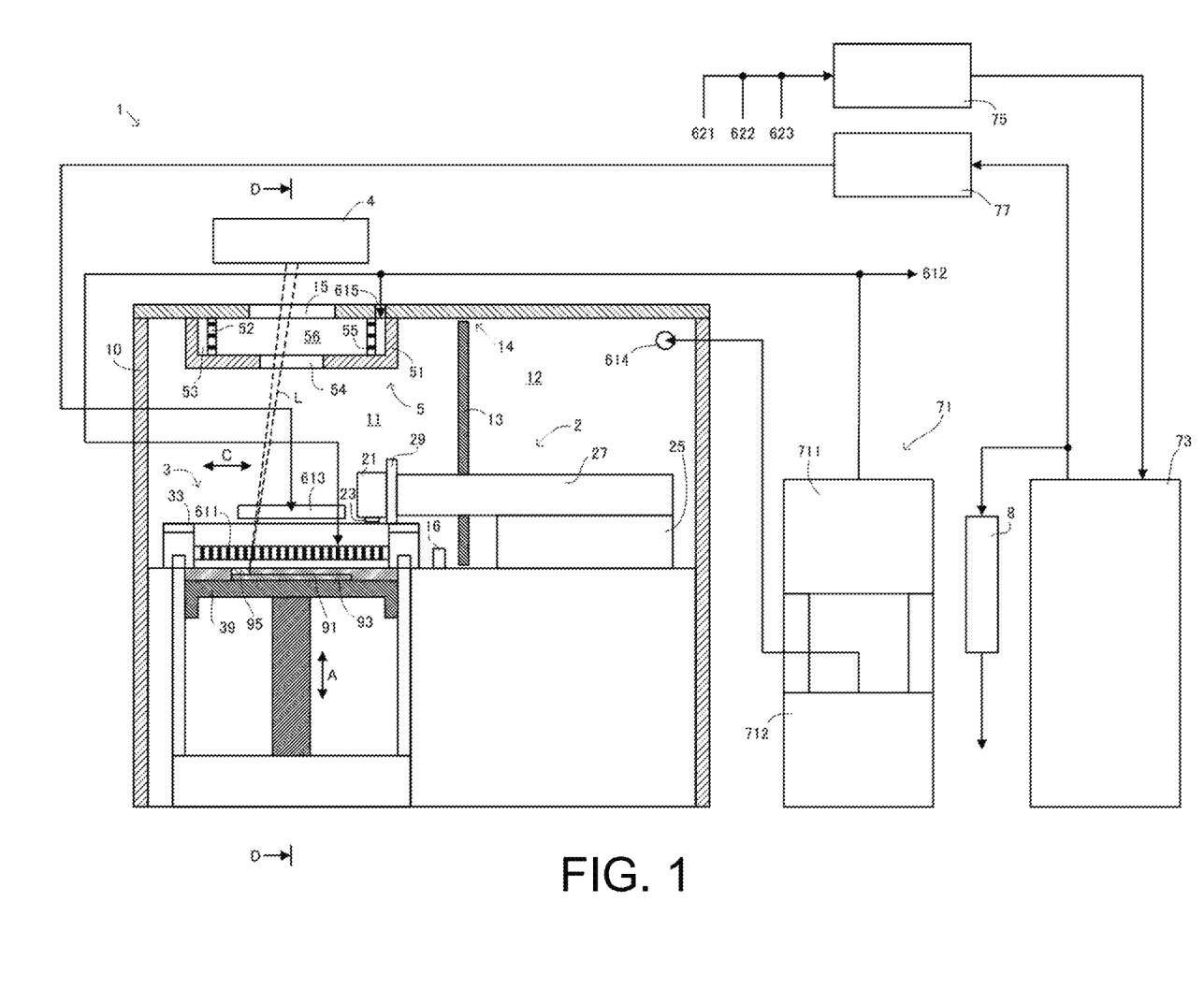
FIG. 1 is a configuration diagram of a laminate molding apparatus according to a first embodiment of the disclosure.
Figure 2:
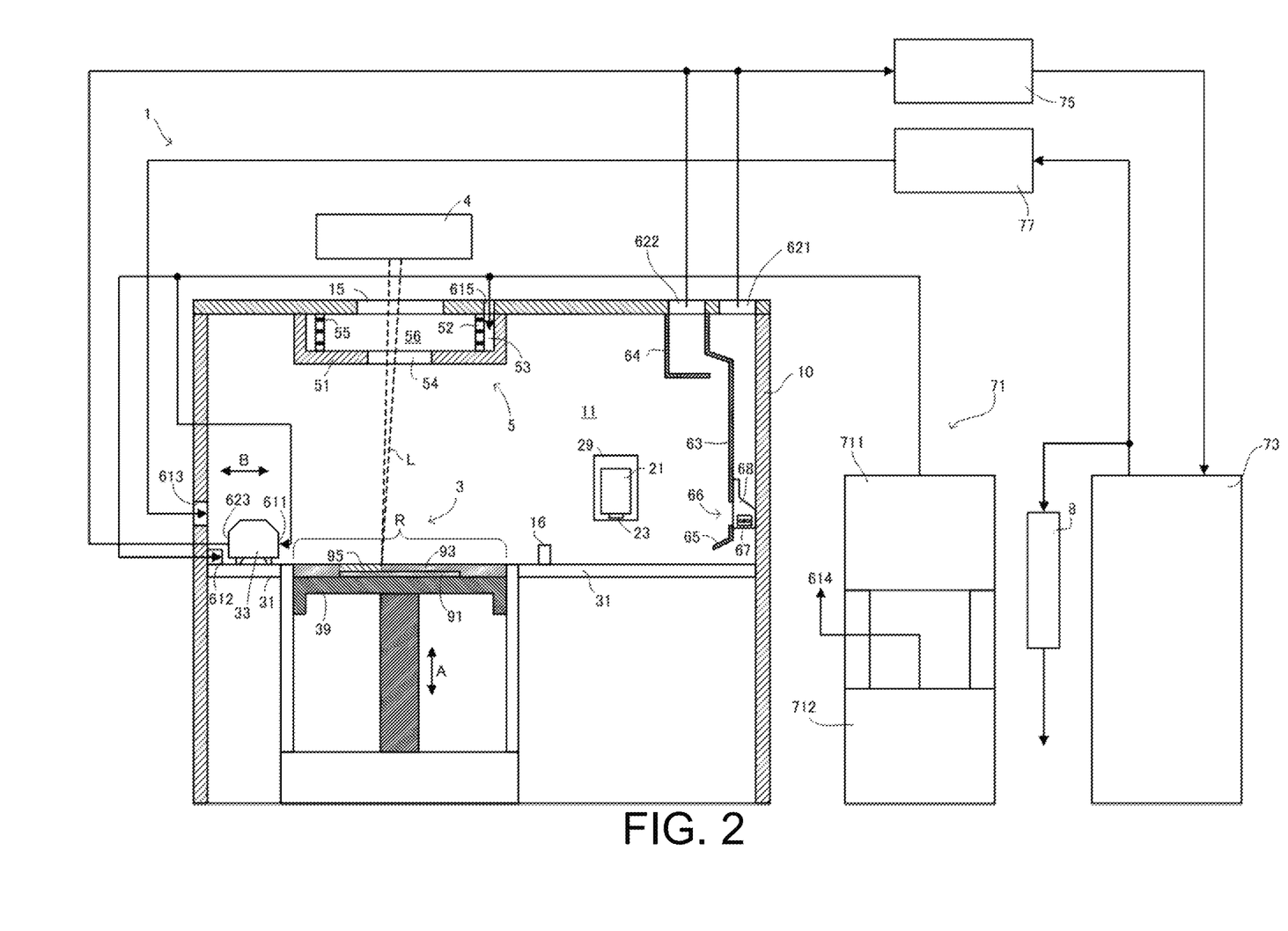
FIG. 2 is a cross-sectional view taken along arrows D-D of FIG. 1.

As shown in FIGS. 1 and 2, a laminate molding apparatus 1 according to a first embodiment of the disclosure includes a chamber 10 configured to be substantially sealed. The laminate molding apparatus 1 of the embodiment includes a cutting device 2 which performs cutting on a sintered layer 95. At this time, the chamber 10 is partitioned by a bellows 13 into a molding chamber 11 in which a three-dimensional object is formed and a driving chamber 12 in which major portions of an X-axis driving device 25 and a Y-axis driving device 27 of the cutting device 2 are accommodated. A communicating portion 14 which is a slight gap through which an inert gas can pass is present between the molding chamber 11 and the driving chamber 12.

The cutting device 2 includes a machining head 21 disposed in the molding chamber 11 and having a built-in spindle 23, a Z-axis driving device 29 which moves the machining head 21 in a Z-axis direction, the Y-axis driving device 27 which moves the machining head 21 including the Z-axis driving device 29 in a Y-axis direction, and the X-axis driving device 25 which moves the machining head 21 together with the Y-axis driving device 27 and the Z-axis driving device 29 in an X-axis direction. The spindle 23 is configured to be capable of rotating a cutting tool such as an end mill that is installed on the spindle 23. With such a configuration, the machining head 21 can move the spindle 23 to any position in the molding chamber 11 and can perform a cutting work on the sintered layer 95. The cutting work may be performed on an end surface of the sintered layer 95 each time a predetermined number of sintered layers 95 are formed using this cutting tool. Also, when the recoater head 33 collides with a raised portion of the sintered layer 95, the cutting work on an upper surface of the sintered layer 95 may be performed to remove the raised portion.

A powder layer forming device 3 is provided in the molding chamber 11. The powder layer forming device 3 includes a base table 31 having a molding region R, and a recoater head 33 disposed on the base table 31 and configured to be movable in a horizontal one-axis direction (the direction of an arrow B). A molding table 39 which is movable in a vertical direction (the direction of an arrow A) is provided in the molding region R. When the laminate molding apparatus 1 is used, the molding plate 91 is disposed on the molding table 39, and a material powder layer 93 is formed on the molding table 39. The molding region R represents a working region in which the molding is performed, that is, the whole of the largest region in which the material powder layer 93 can be formed to form the sintered layer 95 and thus the three-dimensional object can be formed, and corresponds to an entire upper surface of the molding table 39.

Figure 3:
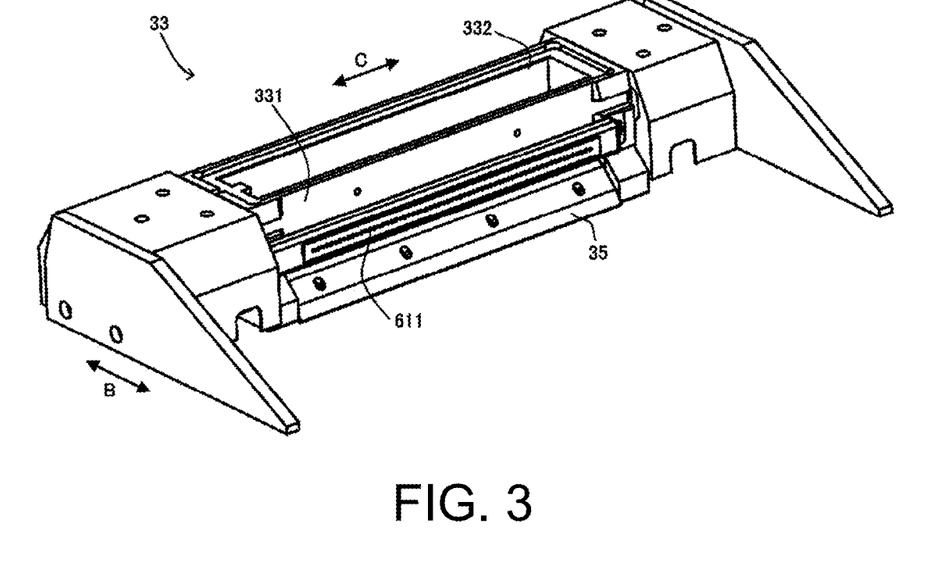
FIG. 3 is a perspective view of a recoater head.
Figure 4:
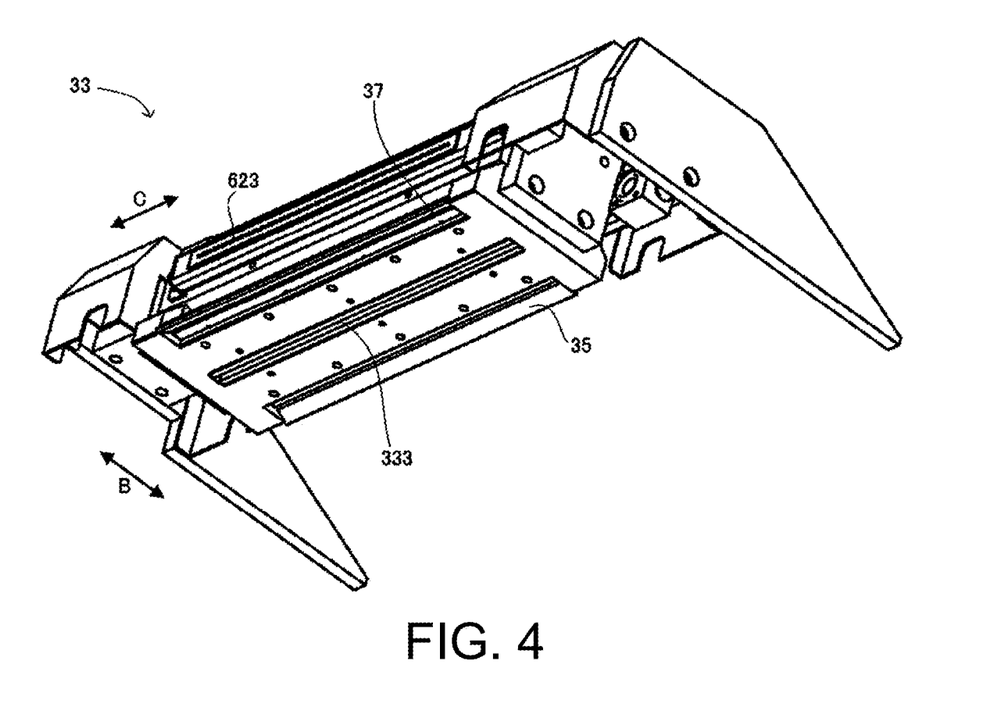
FIG. 4 is a perspective view of a recoater head.

As shown in FIGS. 3 and 4, the recoater head 33 includes a material storage portion 331 which stores the material powder supplied from a material supply device (not shown), a material supply portion 332 which is provided on an upper surface of the material storage portion 331 and serves as an introduction port for the material powder, and a material discharge portion 333 which is provided on a bottom surface of the material storage portion 331 and discharges the material powder in the material storage portion 331. The material discharge portion 333 has a slit shape which extends in a horizontal one-axis direction (the direction of an arrow C) orthogonal to a movement direction (the direction of an arrow B) of the recoater head 33. Further, a blade 35 is provided on one side of the recoater head 33, and a blade 37 is provided on the other side of the recoater head 33. The blades 35 and 37 planarize the material powder discharged from the material discharge portion 333 and form the material powder layer 93. The material powder is, for example, a metal powder such as iron powder, and has, for example, a spherical shape having an average particle diameter of 20 μm.

A laser irradiation device 4 is provided above the molding chamber 11, and a laser beam L output from the laser irradiation device 4 passes through a window 15 provided in the chamber 10 and irradiates a predetermined irradiation region of the material powder layer 93 formed in the molding region R to form the sintered layer 95. The predetermined irradiation region is present in the molding region R and roughly coincides with a region surrounded by a contour shape of the desired three-dimensional object. The laser irradiation device 4 may be configured to be capable of two-dimensionally scanning the laser beam L in the molding region R and includes, for example, a laser beam source which generates the laser beam L, and a pair of galvano scanners capable of two-dimensionally scanning the laser beam L in the molding region R. A type of the laser beam L is not limited as long as it can sinter the material powder, and it may be, for example, a $CO_2$ laser, a fiber laser, a YAG laser. The window 15 is formed of a material which is capable of transmitting the laser beam L. For example, when the laser beam L is a fiber laser or a YAG laser, the window 15 can be formed of quartz glass.

A fume diffusion device 5 is provided on an upper surface of the chamber 10 to cover the window 15. The fume diffusion device 5 includes a cylindrical casing 51 and a cylindrical diffusion member 52 disposed in the casing 51. An inert gas supply space 53 is provided between the casing 51 and the diffusion member 52. Further, an opening 54 is provided in a bottom surface of the casing 51 inside the diffusing member 52. A large number of pores 55 are provided in the diffusion member 52, and a clean inert gas supplied into the inert gas supply space 53 is filled in a clean room 56 through the pores 55. Additionally, the clean inert gas filled in the clean room 56 is ejected downward from the fume diffusing device 5 through the opening 54. The fume diffusion device 5 prevents the window 15 from being contaminated by fumes generated during the formation of the sintered layer 95 and assists with removal of the fumes, which may cross an irradiation path of the laser beam L, from the irradiation path.

An oxygen analyzer 16 which measures an oxygen concentration is provided in the molding chamber 11 of the chamber 10. For example, the oxygen analyzer 16 may directly measure the oxygen concentration or may calculate the oxygen concentration relatively by measuring a concentration of the inert gas. The sintered layer is formed by the laser beam L when the oxygen concentration in the chamber 10 is maintained at a concentration at which the material powder does not substantially degenerate. For example, when the oxygen concentration is 3.0 vol % or less, the sintered layer is formed.

Next, an inert gas supply/discharge path will be described. One or more supply ports of the inert gas supplied from an inert gas supply device 71 or the inert gas returned from the fume collector 73, and one or more discharge ports which discharge the inert gas containing the fumes from the chamber 10 to the fume collector 73 are provided in the chamber 10. In the embodiment, a first supply port 611, a second supply port 612, a third supply port 613, a fourth supply port 614, and a fifth supply port 615 are provided as the supply ports, and a first discharge port 621, a second discharge port 622, and a third discharge port 623 are provided as the discharge ports. Although details will be described later, the inert gas supply device 71 includes a first inert gas supply device 711 and a second inert gas supply device 712. Each part is connected by a pipe line such as a hose, a pipe or the like.

The first supply port 611 is provided in one side surface of the recoater head 33. The second supply port 612 is provided in piping laid on an end surface of the base table 31 on a side opposite to the side on which the first supply port 611 is provided. The first supply port 611 and the second supply port 612 are connected to the first inert gas supply device 711, and the inert gas having a predetermined pressure and flow rate is selectively supplied to the chamber 10 through the first supply port 611 or the second supply port 612 according to a movement position of the recoater head 33. That is, when the first supply port 611 is located at a position at which the first supply port 611 faces the irradiation region, the inert gas is supplied through the first supply port 611. When the first supply port 611 is located at the position at which the first supply port 611 does not face the irradiation region, the inert gas is supplied through the second supply port 612. The third supply port 613 is provided in a side wall of the chamber 10 on the side at which the second supply port 612 is provided and is located at a height lower than a center of the molding chamber 11. The third supply port 613 is connected to the fume collector 73, and the clean inert gas from which the fumes are removed is returned to the chamber 10 through the third supply port 613. The fourth supply port 614 is provided in an upper portion of the driving chamber 12. The inert gas supplied from the second inert gas supply device 712 to the driving chamber 12 is supplied into the molding chamber 111 through the communicating portion 14. The fifth supply port 615 is provided in an upper portion of the fume diffusion device 5, and the inert gas is supplied from the first inert gas supply device 711 to the inert gas supply space 53 of the fume diffusion device 5.

A partition plate 63 is provided to cover a side wall of the chamber 10 opposite to the side wall at which the second supply port 612 and the third supply port 613 are provided. The first discharge port 621 is provided at an upper end of the chamber 10 in a space partitioned by the partition plate 63 and the side wall. The second discharge port 622 is provided at the upper end of the chamber 10 on the irradiation region side near the partition plate 63. Further, an upper guide plate 64 extending in an L-shaped cross section is provided below the second discharge port 622 on the partition plate 63 side to surround the second discharge port 622. A lower guide plate 65 of which a lower portion extends toward the irradiation region is provided at a lower end of the partition plate 63, and a predetermined gap 66 is formed between the partition plate 63 and the lower guide plate 65.

The gap 66 is located at a height lower than a center of the molding chamber 11. A plurality of fans 67 which suction the inert gas are provided in the vicinity of the gap 66 in the space partitioned by the partition plate 63 and the side wall, and straightening plates 68 which extend upward are provided at both ends of each of the fans 67. The inert gas sent to the vicinity of the partition plate 63 passes through the gap 66 or a space below the guide plate 65, and then passes through the space partitioned by the partition plate 63 and the side wall, and is sent to the first discharge port 621. Further, the inert gas which has not be collected from the gap 66 ascends along the partition plate 63, is guided by the upper guide plate 64 and then sent to the second discharge port 622. The third discharge port 623 is provided in a side surface of the recoater head 33 in which the first supply port 611 is not provided. The inert gas is discharged from the chamber 10 through the first discharge port 621, the second discharge port 622 and the third discharge port 623 and is sent to the fume collector 73.

The inert gas supply device 71 supplies the inert gas such as nitrogen into the chamber 10. As the inert gas supply device 71, any device such as a gas cylinder or a gas generating device can be adopted as long as it can supply an inert gas having a predetermined concentration. The embodiment includes the first inert gas supply device 711 and the second inert gas supply device 712. The first inert gas supply device 711 is, for example, capable of supplying an inert gas having a higher concentration than that in the second inert gas supply device 712. The first inert gas supply device 711 is, for example, a PSA type nitrogen generating device. The second inert gas supply device 712 is, for example, a membrane separation type nitrogen generating device. As described above, the first inert gas supply device 711 is connected with the first supply port 611, the second supply port 612, and the fifth supply port 615, and the second inert gas supply device 712 is connected with the fourth supply port 614. With such a configuration, an inert gas having a higher concentration can be supplied into the molding chamber 11 in which the inert gas concentration directly influences the molding, and a required inert gas supply amount can be maintained. The inert gas is a gas which does not substantially react with the material powder, and an appropriate one is selected from nitrogen gas, argon gas, helium gas, and so on according to a type of the material powder.

Figure 5:
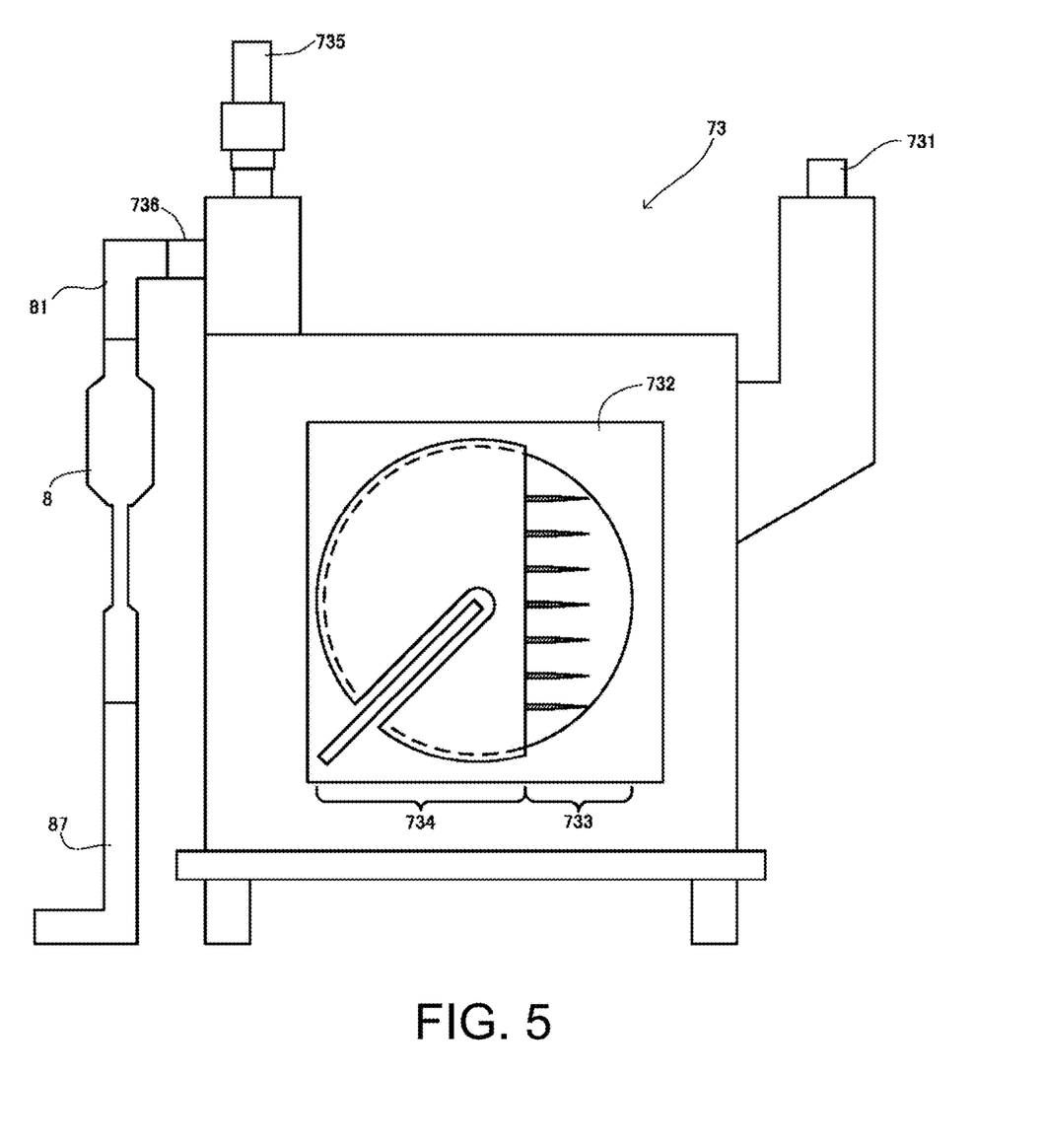
FIG. 5 is a configuration diagram showing details of a fume collector.

The fume collector 73 is, for example, a dry electric dust collecting device. As shown in FIG. 5, the fume collector 73 includes a dust collecting device 732 having a charging portion 733 which charges the fumes and a dust collecting portion 734 which collects the charged fumes, and removes the fumes from the inert gas using the dust collecting device 732. Further, duct boxes 75 and 77 are provided on the upstream side and the downstream side of the fume collector 73, respectively. The inert gas including the fumes discharged from the chamber 10 is sent to an upstream port 731 of the fume collector 73 through the duct box 75, the fumes are removed by the dust collecting device 732, and the clean inert gas is discharged from a downstream port 735 of the fume collector 73 and sent to the third supply port 613 of the chamber 10 through the duct box 77. With such a configuration, the inert gas can be reused. Also, in the embodiment, a branch path 736 through which the clean inert gas is branched is provided between the dust collecting device 732 and the downstream port 735, and the branch path 736 and an evacuate device 8 are connected with each other, as will be described later. The fume collector 73 may be another type, for example, a filtration type dust collecting device including a filter as a dust collecting device. Furthermore, in order to efficiently circulate the inert gas inside the fume collector 73, a fan motor may be provided in the fume collector 73.

Figure 6:
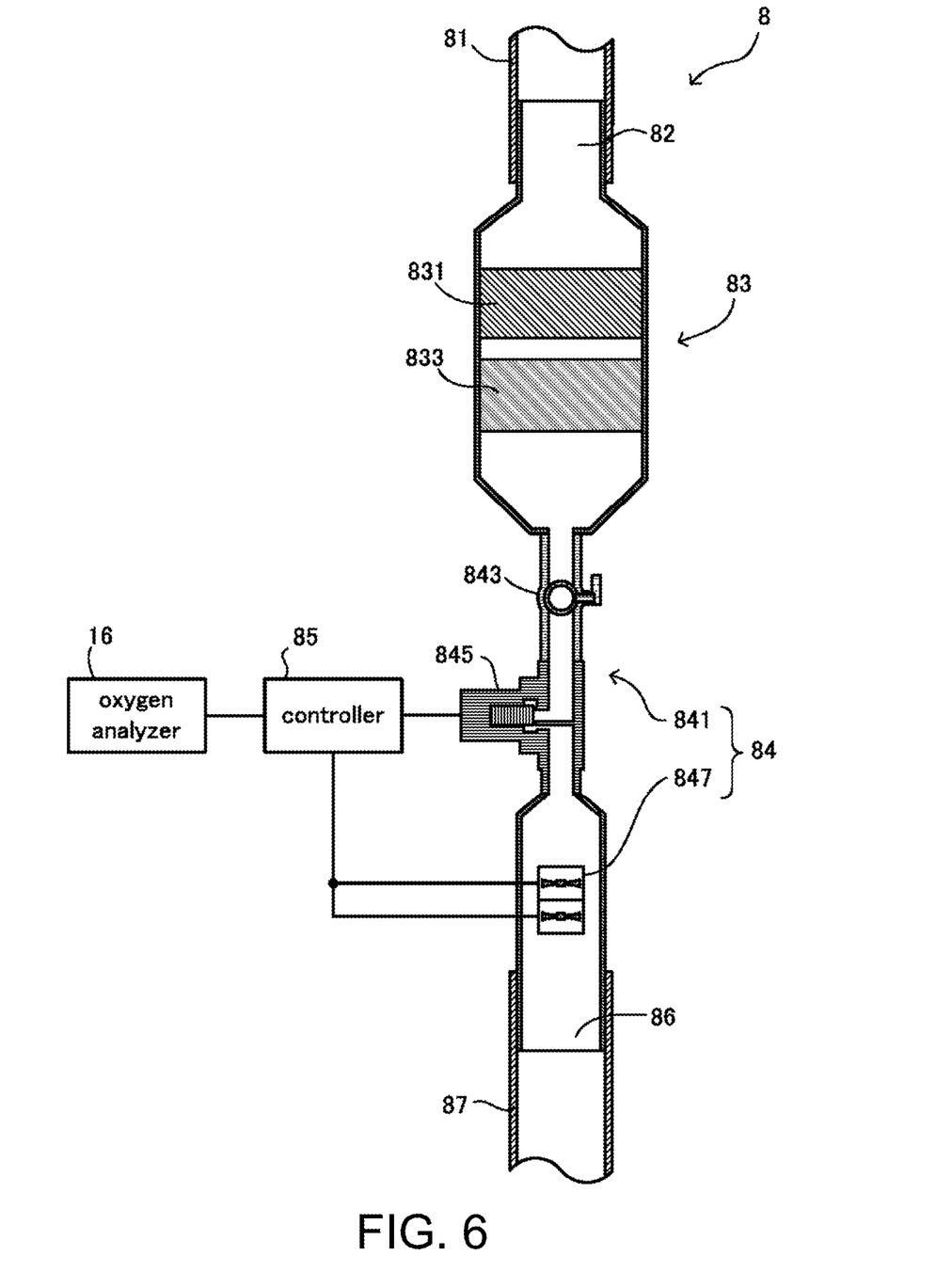
FIG. 6 is a configuration diagram showing details of an evacuate device.

Here, the configuration of the evacuate device 8 will be described with reference to FIG. 6. The evacuate device 8 includes an intake port 82, a filter portion 83, an evacuate amount adjusting portion 84, a controller 85, and an evacuate port 86.

The intake port 82 is connected to the downstream side in which the inert gas is returned from the dust collecting device 732 to the chamber 10, and the inert gas from which most of the fumes have been removed by the dust collecting device 732 is sent from the intake port 82 to the inside of the evacuate device 8. In the embodiment, the intake port 82 is connected to the branch path 736 of the fume collector 73 via an intake pipe 81, but other forms may be used. For example, the intake port 82 may be connected to a pipe line which connects the downstream port 735 of the fume collector 73 with the chamber 10 or may be connected to the third supply port 613 of the chamber 10. Further, the evacuate device 8 may be provided inside the fume collector 73, and the inert gas which has passed through the dust collecting device 732 may be directly branched to the intake port 82 and be sent to the evacuate device 8.

The filter portion 83 removes the fumes from the inert gas. The filter portion 83 includes, for example, a prefilter 831 having a relatively low collection rate and a main filter 833 having a relatively high collection rate. The prefilter 831 is, for example, a nonwoven fabric filter. The main filter 833 is, for example, a HEPA filter. With such a configuration, the fumes can be appropriately removed by the main filter 833 having the high collection rate, and contamination of the main filter 833 can be suppressed. The filter portion 83 may be provided at an optional position in the evacuate device 8. In one or some exemplary embodiments, the filter portion 83 is provided relatively upstream in order to prevent each member in the evacuate device 8 from being contaminated by the fumes. In particular, the filter portion 83 may be provided upstream of an air blower 847. Further, a clogging detection sensor (not shown) which detects clogging of the filter portion 83 may be provided. The clogging detection sensor may be configured to detect a flow rate of the inert gas or may be configured to detect a differential pressure between an upstream side and a downstream side of the prefilter 831 and the main filter 833. In the embodiment, since the inert gas from which most of the fumes have been removed by the dust collecting device 732 in advance is sent to the evacuate device 8, it is not indispensable to provide the filter portion 83. However, since it is possible to clean the inert gas to be evacuated, the filter portion 83 is provided in some exemplary embodiments.

The evacuate amount adjusting portion 84 adjusts the evacuate amount of the inert gas. In the embodiment, the evacuate amount adjusting portion 84 is a valve body 841 which limits the evacuate of the inert gas and the air blower 847 which forms an air flow in an evacuate direction. The evacuate amount adjusting portion 84 may be configured so that the evacuate amount of the inert gas can be adjusted, and for example, only one of the valve body 841 and the air blower 847 may be provided. The valve body 841 includes an adjustment valve 843 which adjusts the evacuate amount of the inert gas, and an on-off valve 845 which opens and closes a flow path of the inert gas. The adjustment valve 843 is, for example, a ball valve, and the on-off valve 845 is, for example, an electromagnetic valve. Since a leakage amount of the inert gas differs for each of the laminate molding apparatuses 1, the evacuate amount may be adjusted by the adjustment valve 843. The adjustment valve 843 is adjusted so that a total amount of the evacuate amount and the leakage amount per unit time from the evacuate device 8 is equal to or larger than a supply amount per unit time from the inert gas supply device 71. In the embodiment, the valve body 841 is configured to have the adjustment valve 843 and the on-off valve 845. However, it may be configured with, for example, a proportional valve which serves as both of the adjustment valve 843 and the on-off valve 845 and which can also control the flow rate in proportion to a control signal. Further, in the embodiment, the air blower 847 is configured with two fan motors, but other configurations may be adopted as long as a desired air flow can be formed in the evacuate direction.

The controller 85 controls the evacuate amount adjusting portion 84. Specifically, the controller 85 is connected with the on-off valve 845 and the air blower 847 and switches ON/OFF of the evacuate. The inside of the chamber 10 should be kept at a predetermined oxygen concentration, such that the material powder does not degenerate. Therefore, the controller 85 is further connected to the oxygen analyzer 16 and controls the evacuate according to the oxygen concentration in the chamber 10. That is, when the oxygen concentration in the chamber 10 measured by the oxygen analyzer 16 is equal to or lower than a predetermined value, the on-off valve 845 is opened and the air blower 847 is operated to generate the air flow in the evacuate direction. On the other hand, when the oxygen concentration exceeds the predetermined value, the on-off valve 845 is closed and the air blower 847 is stopped. Accordingly, it is possible to prevent pressure rise in the chamber 10 as much as possible. That is, the controller 85 controls the evacuate amount adjusting portion 84 to perform the evacuate more than the supply amount of the inert gas while maintaining the predetermined concentration at which the inert gas in the chamber 10 does not substantially react with the material powder. The predetermined value of the oxygen concentration serving as a criterion for switching ON/OFF of the evacuate is set to be equal to or more than a value at which the material powder does not substantially degenerate, for example, 3.2 vol %. The controller 85 of the evacuate device 8 may be provided separately or may be in incorporated in a numerical controller which controls the laminate molding.

The evacuate port 86 evacuates the clean inert gas from which the fumes have been removed to the outside of the laminate molding apparatus 1 via an evacuate pipe 87. Since the clean inert gas is evacuated, it may be directly evacuated into a room in which the laminate molding apparatus 1 is installed, and even in this case, there is no fear of contaminating the surrounding atmosphere.

The evacuate device 8 is configured as described above, and the evacuate is controlled so that an internal atmospheric pressure which is the atmospheric pressure in the chamber 10 becomes equal to or lower than an external atmospheric pressure which is the atmospheric pressure outside the laminate molding apparatus 1. Accordingly, the internal atmospheric pressure and the external atmospheric pressure are maintained substantially uniform. Since the evacuate is performed beyond the supply amount of the inert gas, the atmospheric pressure in the chamber 10 does not increase during at least the evacuate. Further, when the inside of the chamber 10 is in a negative pressure state, external air easily intrudes into the chamber 10, but when the oxygen concentration exceeds the predetermined value, the evacuate is interrupted, and thus the atmospheric pressure in the chamber 10 is not excessively reduced. The internal atmospheric pressure and the external atmospheric pressure may be uniform as long as the leakage of inert gas from the chamber 10 is suppressed.

Figure 7:
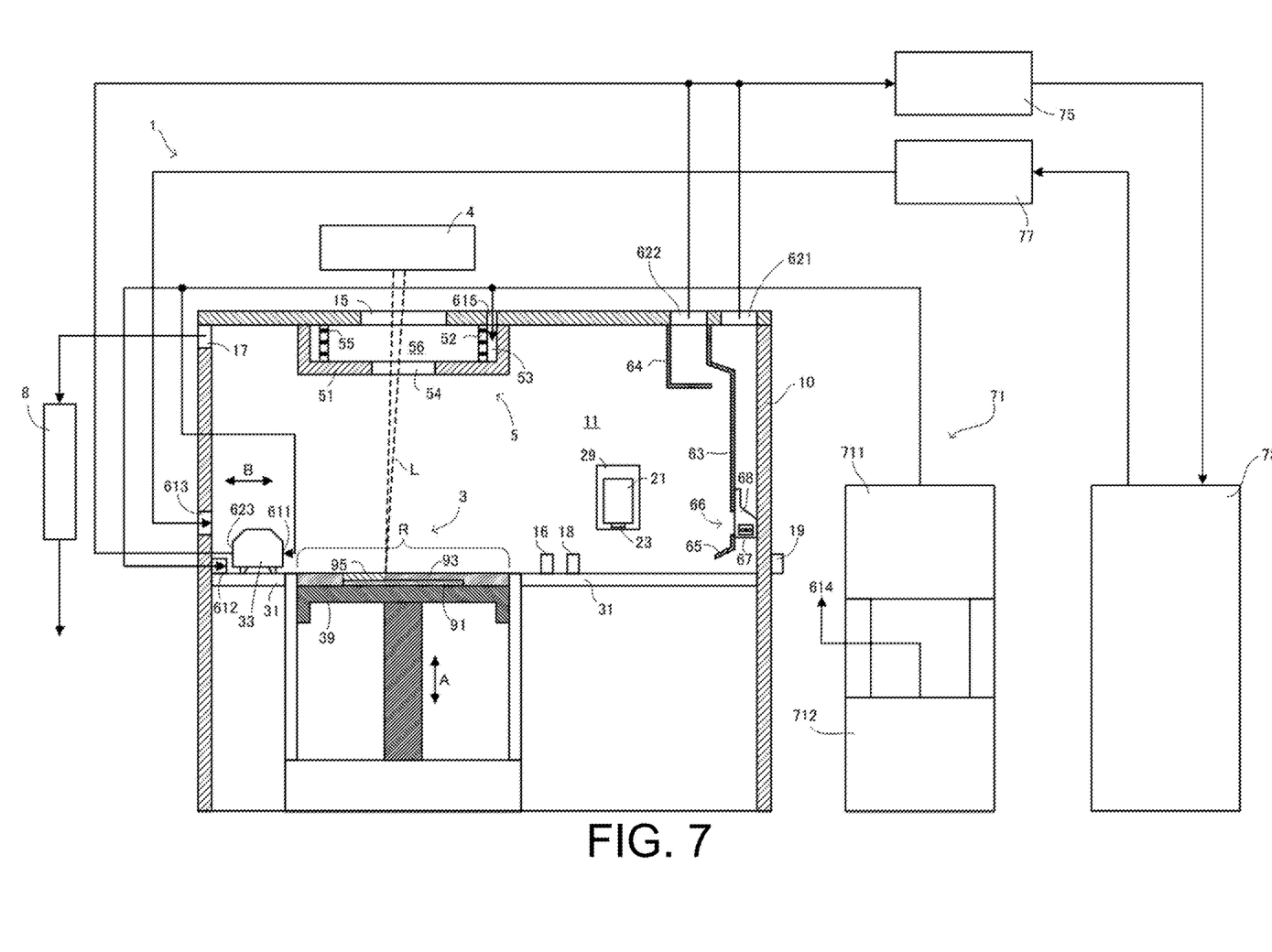
FIG. 7 is a configuration diagram of a laminate molding apparatus 1 according to a second embodiment of the disclosure.

Next, a laminate molding apparatus 1 of a second embodiment will be described with reference to FIG. 7. In FIG. 7, as in FIG. 2, the molding chamber 11 is displayed on the front side of the drawing. Members equivalent to those in the first embodiment are designated by the same reference numerals, and a detailed description thereof will be omitted.

In the embodiment, a ventilation port 17 is provided in the chamber 10, and the ventilation port 17 and the intake port 82 are connected to each other via the intake pipe 81. In such a configuration, the inert gas sent to the evacuate device 8 may contain a lot of fumes. Therefore, a dust collecting portion is provided to remove the fumes from the inert gas in at least one of the ventilation port 17, the intake pipe 81, and the evacuate device 8. In the embodiment, the filter portion 83 provided in the evacuate device 8 serves as the dust collecting portion. Like in the first embodiment, the filter portion 83 includes, for example, the prefilter 831 and the main filter 833.

Further, in the embodiment, it is configured to control the evacuate by measuring a value of the internal atmospheric pressure. Specifically, the laminate molding apparatus 1 includes an internal atmospheric pressure measuring meter 18 which measures the internal atmospheric pressure, and the controller 85 of the evacuate device 8 controls the evacuate amount adjusting portion 84 and switches the ON/OFF of the evacuate so that a difference between a measured value of the internal atmospheric pressure measuring meter 18 and a value of the external atmospheric pressure is within a predetermined range. A predetermined value (for example, 1 atm) may be preset as the value of the external atmospheric pressure, but when an external atmospheric pressure measuring meter 19 which measures the external atmospheric pressure is further provided and the ON/OFF of the evacuate is switched so that a difference between the measured value of the internal atmospheric pressure measuring meter 18 and the measured value of the external atmospheric pressure measuring meter 19 is within a predetermined range, it is possible to more accurately equalize the internal atmospheric pressure and the external atmospheric pressure. The predetermined range of the difference between the external atmospheric pressure and the external atmospheric pressure, which is the criterion for switching the ON/OFF of the evacuate, may be set within a range in which the leakage of the inert gas from the chamber 10 is suppressed.

Regarding the ON/OFF of the evacuate, in the first embodiment, it is controlled with reference to the oxygen concentration in the chamber 10, and in the second embodiment, it is controlled with reference to the value of the internal atmospheric pressure. However, other control methods may be used as long as the internal atmospheric pressure and the external atmospheric pressure can be held substantially uniform within a range in which the leakage of the inert gas is suppressed. Further, both the control methods may be combined, that is, the evacuate may be performed when the oxygen concentration in the chamber 10 is equal to or less than a predetermined value and the difference between the internal atmospheric pressure and the external atmospheric pressure is outside the predetermined range. In addition, the fume collector 73 may be configured to clean the fumes adhering to the inside of the dust collecting device 732 during the molding, but since the fumes cannot be removed during cleaning, the evacuate due to the evacuate device 8 may be stopped during the cleaning.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A laminate molding apparatus, comprising:
   a chamber enclosing a molding region;
   a laser irradiation device which irradiates a predetermined irradiation region of a material powder layer formed for each of a plurality of division layers obtained by dividing a desired three-dimensional object at a predetermined height with respect to the molding region with a laser beam and forms a sintered layer;
   an inert gas supply device which supplies an inert gas into the chamber;
   a fume collector which includes a dust collecting device for removing fumes from the inert gas discharged from the chamber and returns the inert gas from which the fumes have been removed to the chamber;
   at least one of an oxygen analyzer which measures an oxygen concentration in the chamber and an internal atmospheric pressure measuring meter which measures an atmospheric pressure in the chamber; and
   an evacuate device which evacuates the inert gas to an outside of the laminate molding apparatus,
   wherein the evacuate device comprises
      a housing having an intake port formed on one end of the housing which is connected to any part of the laminate molding apparatus through which the inert gas flows and takes in the inert gas and an evacuate port formed on the other end of the housing which evacuates the inert gas from which the fumes have been removed to the outside of the laminate molding apparatus,
      a filter portion provided in the housing between the intake port and the evacuate port which removes the fumes,
      an evacuate amount adjusting portion provided in the housing between the intake port and the evacuate port which adjusts an evacuate amount of the inert gas to the outside of the laminate molding apparatus, wherein the evacuate amount adjusting portion has an adjustment valve which adjusts an evacuate amount of the inert gas to the outside of the laminate molding apparatus, an on-off valve which opens and closes a flow path of the inert gas, and an air blower which forms an air flow in an evacuate direction to the outside of the laminate molding apparatus, and
      a controller which controls the evacuate amount adjusting portion to perform evacuate of the inert gas to the outside of the laminate molding apparatus such that the atmospheric pressure in the chamber and an external atmospheric pressure become uniform within a range in which leakage of the inert gas from the chamber is suppressed based on at least one of the oxygen concentration in the chamber and the atmospheric pressure in the chamber,
   wherein the controller is connected to the at least one of the oxygen analyzer and the internal atmospheric pressure measuring meter, and to the on-off valve and the air blower of the evacuate amount adjusting portion,
   wherein the intake port of the housing is connected to a downstream side of the dust collecting device at which the inert gas is returned from the dust collecting device to the chamber, or the intake port of the housing is directly connected to the chamber.

2. The laminate molding apparatus according to claim 1, wherein the intake port of the housing is connected to the downstream side of the dust collecting device at which the inert gas is returned from the dust collecting device to the chamber, and the evacuate port evacuates the inert gas from which the fumes have been removed by at least the dust collecting device to the outside of the laminate molding apparatus.

3. The laminate molding apparatus according to claim 1, wherein the intake port of the housing is directly connected to the chamber, and the evacuate port removes the fumes from the inert gas discharged from the chamber and then evacuates the inert gas to the outside of the laminate molding apparatus.

4. The laminate molding apparatus according to claim 1, wherein the evacuate device evacuates the inert gas to the outside of the laminate molding apparatus when the oxygen concentration is equal to or less than a predetermined value.

5. The laminate molding apparatus according to claim 1, wherein the evacuate device evacuates the inert gas to the outside of the laminate molding apparatus so that a difference between a measured value of the internal atmospheric pressure measuring meter and a value of the external atmospheric pressure is within a predetermined range.

6. The laminate molding apparatus according to claim 1, further comprising an external atmospheric pressure measuring meter which measures an atmospheric pressure outside the laminate molding apparatus, wherein the evacuate device evacuates the inert gas to the outside of the laminate molding apparatus so that a difference between the measured value of the internal atmospheric pressure measuring meter and a measured value of the external atmospheric pressure measuring meter is within the predetermined range.

\* \* \* \* \*